United States Patent
Tanimoto et al.

[11] Patent Number: 6,081,661
[45] Date of Patent: Jun. 27, 2000

[54] COMMAND VALUE DECISION UNIT

[75] Inventors: Masahiko Tanimoto; Yoshio Izui, both of Tokyo, Japan

[73] Assignee: Mitsubishi Denki Kabushiki Kaisha, Tokyo, Japan

[21] Appl. No.: 08/900,467

[22] Filed: Jul. 25, 1997

[30] Foreign Application Priority Data

Mar. 6, 1997 [JP] Japan .................................... 9-052138

[51] Int. Cl.⁷ .................................................. G05B 13/04
[52] U.S. Cl. ................ 395/500.23; 706/907; 364/528.21
[58] Field of Search ......................... 364/528.21, 528.22, 364/528.23

[56] References Cited

U.S. PATENT DOCUMENTS 5,159,562  10/1992  Putman et al. ........................... 364/494
5,486,995   1/1996  Krist et al. .............................. 364/149

FOREIGN PATENT DOCUMENTS 8-163783   6/1996   Japan .

OTHER PUBLICATIONS

Chowdhury et al, "A Review of Recent Advances in Economic Dispatch", IEEE Transactions on Power Systems, vol. 5, No. 4, Nov. 1990.

El–Hawary, Electrical Power Systems: Design and Analysis, pp. 708–716, 1995.

"On–Line Economic Load Dispatch Based on Fuel Cost Dynamics" by M. Yoshikawa et al, 96 WM 289–9 PWRS, IEEE Power Engineering Society, 1996 IEEE/PES Winter Meeting.

Bartholomew–Biggs, "Algorithms for General Constrained Nonlinear Optimization", published in "Algorithms for Continuous Optimization: The State of the Art", pp. 169–207, Spedicato, 1994.

*Primary Examiner*—Kevin J. Teska
*Assistant Examiner*—Samuel Broda
*Attorney, Agent, or Firm*—Sughrue, Mion, Zinn, Macpeak & Seas, PLLC

[57] ABSTRACT

A command value decision unit capable of solving a problem of a conventional system in that when using a static fuel consuming characteristic model obtained by the least squares method as a fuel consuming characteristic model, it is sometimes difficult to decide the output command value $P_m^*$ of each plant at high accuracy owing to the deviation of collected data and the response delay of the plants. The command value decision unit generates an output decision model of each plant by extracting items that affect the fuel consumption at the present time from among the items of the fuel consuming characteristic model of each plant, which is formed by taking account of hysteresis characteristics of the plant, and decides the output command value of the plant on the basis of the output decision model.

8 Claims, 17 Drawing Sheets

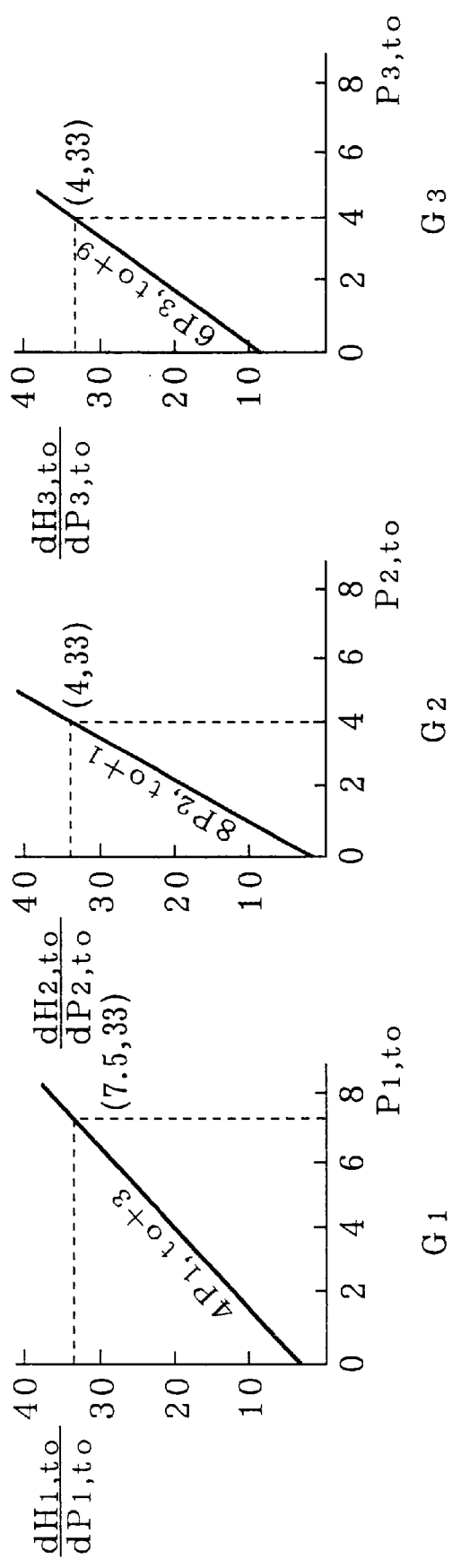

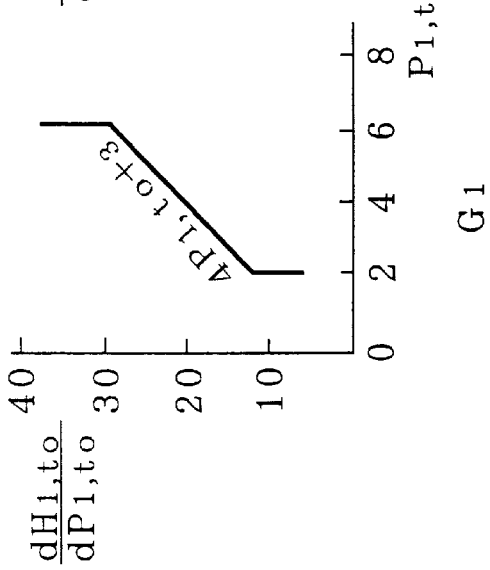

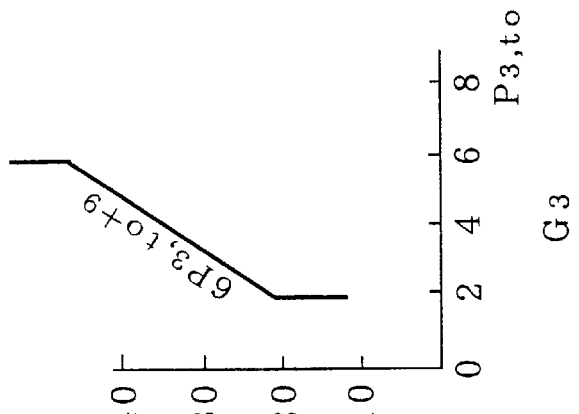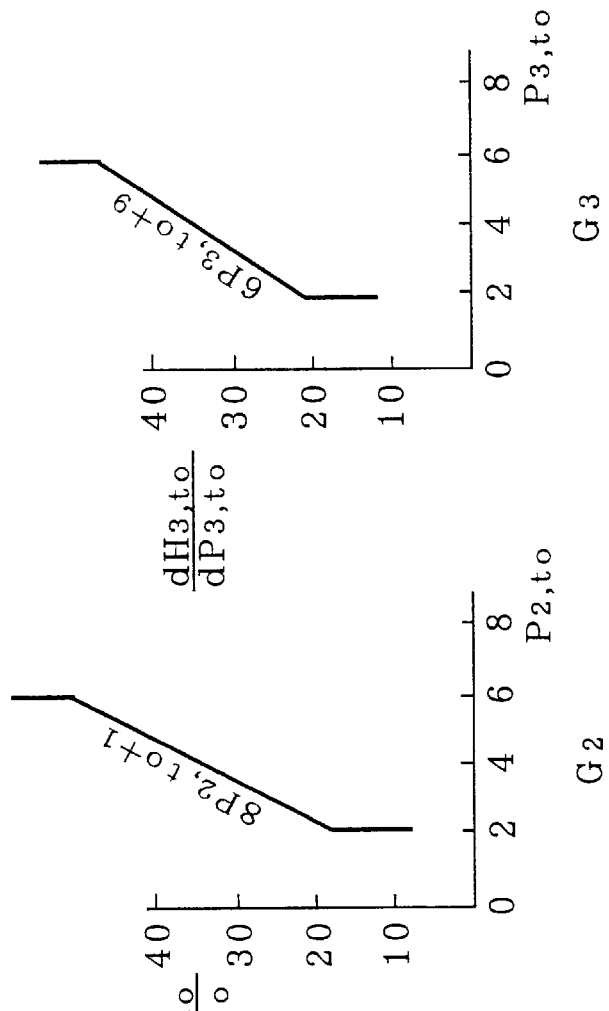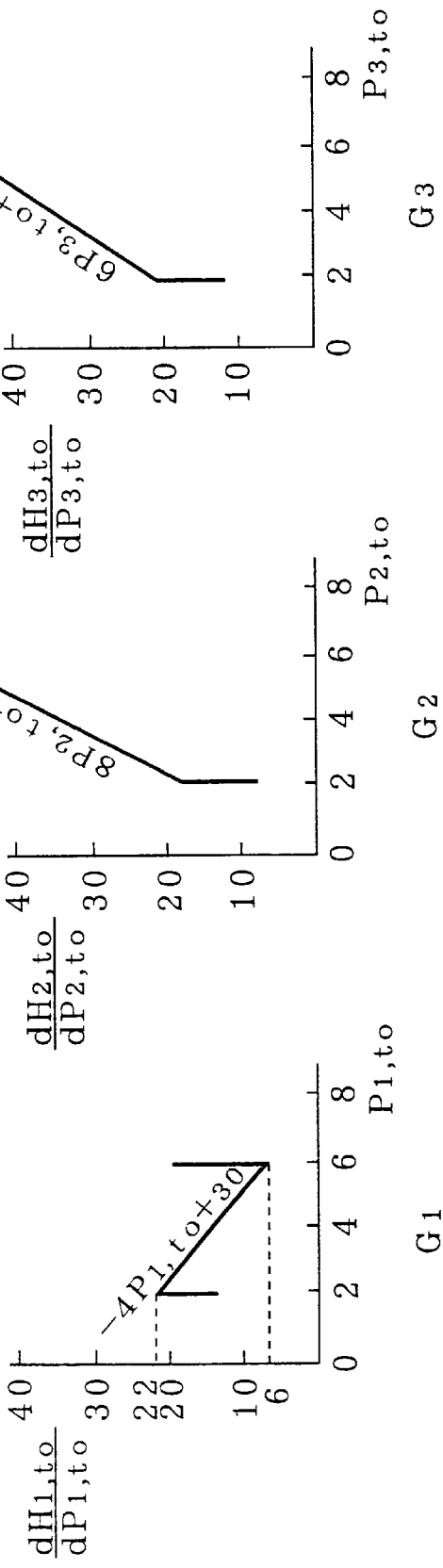

COMMAND VALUE DECISION UNIT

BACKGROUND OF THE INVENTION

1. Field of the Invention

The present invention relates to a command value decision unit for constructing and controlling a plant model so that the operation expense such as fuel cost of interlinked plants is made minimum under the constraint of keeping constant the total output of the plants.

2. Description of Related Art

FIG. 16 is a block diagram showing a conventional command value decision unit. In this figure, the reference numeral 1 designate a fuel consuming characteristic model generator which collects data about fuel consumption $Q_m$ for the output $P_m$ of each of interlinked plants $G_m$, and which generates a fuel consuming characteristic model $F_m$ associated with each plant $G_m$; 2 designates a memory for storing the fuel consuming characteristic models $F_m$ generated by the fuel consuming characteristic model generator 1; 3 designates a differential calculator for differentiating the fuel consuming characteristic model $F_m$ associated with each plant $G_m$ by the output $P_m$ of that plant $G_m$; and 4 designates a command value calculator which calculates the output $P_m$ of each plant $G_m$ such that the respective derivatives $dF_m/dP_m$ obtained by the differential calculator 3 coincide under the constraint that the sum total of the outputs $P_m$ of the plants $G_m$ agrees with an estimated load amount L, and makes the calculation results as the output command values $P_m^*$ of the plants $G_m$.

Next, the operation will be described.

First, the fuel consuming characteristic model generator 1 collects data about the fuel consumption $Q_m$ of the output $P_m$ of each of the interlinked plants $G_m$. Thus, if m-plants are interlinked, the data are collected for each of them.

For example, as shown the diagram of FIG. 17, the data for one day from 12 o'clock at night to the next midnight are collected. The fuel consuming characteristic model generator 1, having collected the data, generates the fuel consuming characteristic model $F_m$ associated with each plant $G_m$ by modeling the fuel consumption $Q_m$ for the output $P_m$ of each plant $G_m$ using the following quadratic function.

$$F_m = Q_m = aP_m^2 + bP_m + c \quad (1)$$

where the values of the coefficients a, b and c are determined such that they best represent the actual characteristics using the least squares method or the like.

When the fuel consuming characteristic model generator 1 generates the fuel consuming characteristic model $F_m$ of each plant $G_m$, the memory 2 stores them. In the following description, it is assumed for brevity and convenience that three plants $G_1$, $G_2$ and $G_3$ are interlinked as shown in FIG. 18, and a method will be described for making decision of the output command values $P_1^*$, $P_2^*$ and $P_3^*$ of the plant $G_1$, $G_2$ and $G_3$ using a fixed-incremental fuel cost method which is disclosed, for example, in "Power System Engineering", pp. 262–273, published by Corona Publishing Co. Ltd, 1977.

The following equations are assumed as the fuel consuming characteristic models $F_1$, $F_2$ and $F_3$ of the plants $G_1$, $G_2$ and $G_3$ (see, FIGS. 19A–19C).

$$F_1 = 2P_1^2 + 3P_1 + 1 \quad (2)$$

$$F_2 = P_2^2 + 4P_2 + 2 \quad (3)$$

$$F_3 = P_3^2 + P_3 + 6 \quad (4)$$

Once the fuel consuming characteristic models $F_1$, $F_2$ and $F_3$ of the plants $G_1$, $G_2$ and $G_3$ have been stored in the memory 2, the differential calculator 3 differentiates the fuel consuming characteristic models $F_1$, $F_2$ and $F_3$ of the plants $G_1$, $G_2$ and $G_3$ by the outputs $P_1$, $P_2$ and $P_3$ of the plants $G_1$, $G_2$ and $G_3$, respectively (see, FIGS. 20A–20C).

Each of the derivatives represents the increment of the fuel consumption against the increment of the output of each of the plants.

$$dF_1/dP_1 = 4P_1 + 3 \quad (5)$$

$$dF_2/dP_2 = 2P_2 + 4 \quad (6)$$

$$dF_3/dP_3 = 2P_3 + 1 \quad (7)$$

When the differential calculator 3 has completed the differential calculation, the command value calculator 4 calculates the output command values $P_1^*$, $P_2^*$ and $P_3^*$ of the plants $G_1$, $G_2$ and $G_3$ on the basis of the derivatives fed from the differential calculator 3.

If estimated load amount L is eight, for example, the following equation holds because the sum total of the outputs $P_1$, $P_2$ and $P_3$ of the plants $G_1$, $G_2$ and $G_3$ must be eight.

$$L = P_1 + P_2 + P_3 = 8 \quad (8)$$

On the other hand, the sum total of the fuel consumptions of the plants $G_m$ becomes minimum when the increment of the fuel consumption against the increment of the output $P_m$ of each plant $G_m$ coincides with that of all the other plants in the fixed-incremental fuel cost method. In other words, the following equations hold because the increment of the fuel consumption against the increment of the output $P_m$ of the plant $G_m$ coincide with that of the other plants if the derivatives output from the differential calculator 3 coincide with each other.

$$dF_1/dP_1 = dF_2/dP_2 = dF_3/dP_3$$

$$\therefore 4P_1 + 3 = 2P_2 + 4 = 2P_3 + 1 \quad (9)$$

Thus, when the outputs $P_m$ of the plants $G_m$ satisfy both equations (8) and (9), the estimated load amount L can be achieved with a minimum fuel consumption. Accordingly, we calculate the outputs $P_m$ of the plants $G_m$ that satisfy equations (8) and (9).

In this case, the calculation results are $P_1 = 1.5$, $P_2 = 2.5$ and $P_3 = 4$ so that the output command values $P_1^*$, $P_2^*$ and $P_3^*$ of the plants $G_1$, $G_2$ and $G_3$ are decided as follows, and the minimum fuel consumption $F_{min}$ in this case takes the following value.

$$G_1 \rightarrow P_1^* = 1.5 \quad F_1 = 10$$

$$G_2 \rightarrow P_2^* = 2.5 \quad F_2 = 18.25$$

$$G_3 \rightarrow P_3^* = 4.0 \quad F_1 = 26$$

$$F_{min} = F_1 + F_2 + F_3 = 54.25 \quad (10)$$

Finally, the command value calculator 4 supplies the plants $G_1$, $G_2$ and $G_3$ with the thus determined output command values $P_1^*$, $P_2^*$ and $P_3^*$ of the plants $G_1$, $G_2$ and $G_3$, and completes the processings.

In actual plants, however, there are some delays for the outputs of the plants to respond to the increments of the fuel supply for the plants. This often results in rather inaccurate output command values of the fuel consuming characteristic models employed in the conventional command value decision unit. In view of this, "On-line Economic Load Dispatch Based on Fuel Cost Dynamics", by M. Yoshikawa, N. Toshida, N. Nakajima, Y. Harada, M. Tsurugai, and Y. Nakata, IEEE Power Engineering Society, Winter Meeting, 96 WM 289-9 PWRS, applies, to generators as an example of plants, ARMA (AutoRegressive Moving Average)-model-supplemented quadratic model, a dynamic fuel consuming characteristic model capable of describing hysteresis characteristics of the revised ARMA model. It is expressed as $$F_m(t) = Q_m(t) = aP_m^2(t) + bP_m(t) + c + eP_m(t) + fP_m(t-1) + gQ_m(t-1) + h \quad (11)$$

where $P_m(t)$ is the plant (generator) output at time t, $P_m(t-1)$ is the plant (generator) output at time t–1, and $Q_m(t-1)$ is the fuel consumption at the time t–1.

When employing equation (11) as the fuel consumption, the fuel consuming characteristic model cannot be decided at only a particular time point, and hence it becomes necessary to minimize the total fuel cost over a plurality of time points. In other words, the total fuel cost (objective function) to be minimized can be described by following equation (12).

$$\min_{P_m(t)} \sum_{t=1}^{T} \sum_{m=1}^{M} F_m(t) \quad (12)$$

In equation (12), T is the number of the plurality of time points over which the total fuel cost should be minimized where the current time t=1, and M denotes the total number of the plants (generators).

Furthermore, when using equation (11), since the fixed-incremental fuel cost method cannot be applied without change, a method such as QP (Quadratic Programming) should be applied considering the constraints are linear. The constrains include supply and demand balance, upper and lower limits of the plant output, and constraint on the plant output rate, for example.

The conventional command value decision unit thus arranged has a problem in that the output command value $P_m^*$ of each plant $G_m$ cannot be decided at high accuracy owing to deviations of the collected data or the response delay of the plants when using the static fuel consuming characteristic model $F_m$ obtained by the least squares method.

Moreover, when using the dynamic fuel consuming characteristic model which is a revised version of the ARMA model capable of describing the hysteresis characteristics as the fuel consuming characteristic model, it is necessary to apply the QP method or the like instead of the existing fixed-incremental fuel cost method. This, however, presents problems in that it takes a long time for calculation, and that the compatibility is lost with the conventional systems.

SUMMARY OF THE INVENTION

The present invention is implemented to solve the foregoing problem. It is therefore an object of the present invention to provide a command value decision unit capable of deciding the output command values of the plants which minimize the sum total of the fuel consumption at high accuracy.

According to the present invention, there is provided a command value decision unit comprising: fuel consuming characteristic model generating means for generating for each one of interlinked plants a fuel consuming characteristic model taking account of hysteresis characteristics of the plant; output decision model generating means for generating a static output decision model of each plant by extracting from the fuel consuming characteristic model items that affect a fuel consumption at a present time; differential means for differentiating the output decision model of each plant generated by the output decision model generating means by an output of the each plant; and command value calculating means for calculating an output of the each plant under conditions that a sum total of the outputs of the plants at the present time coincides with an estimated load amount, and that derivatives obtained by the differential means coincide with one another, and for setting each one of calculation results as an output command value of the each plant.

Here, the differential means may replace, when at least one output of the plants has an upper limit and a lower limit, derivatives corresponding to the upper limit and lower limit by an infinite.

The differential means may replace, when a slope of the derivative is negative, the derivative by a fixed value.

The command value calculating means may a constraint on a value of energy, which flows through a line interlinking the plurality of plants, to upper and lower limits of the output command value, and corrects the output command value of the plant if the calculated output command value of the plant goes beyond at least one of the upper and lower limits.

The command value decision unit may further comprise model selecting means for selecting a best fit fuel consuming characteristic model and supplies it to the output decision model generating means, wherein the fuel consuming characteristic model generating means may generate for a same plant a plurality of fuel consuming characteristic models, from which the model selecting means may select the best fit fuel consuming characteristic model by estimating matching quality of respective fuel consuming characteristic models taking account of a number of data, a number of parameters and a sum of estimated errors associated with each of the fuel consuming characteristic models.

The command value decision unit may further comprise model selecting means for selecting one of fuel consuming characteristic models and supplies it to the output decision model generating means, wherein the fuel consuming characteristic model generating means may generate as the fuel consuming characteristic model of a same plant a plurality of fuel consuming characteristic models in accordance with parameters including at least one of seawater temperature, fuel types to be used and a number of burner, and wherein the model selecting means may monitor the parameters and carry out selecting of the fuel consuming characteristic model in accordance with the parameters.

The fuel consuming characteristic model generating means may monitor an output and fuel consumption of the each plant, detect errors between monitored amounts and corresponding amounts of the generated fuel consuming characteristic model, and reform the fuel consuming characteristic model in accordance with the errors.

The command value decision unit may further comprise model control means for controlling parameters of the fuel consuming characteristic model in response to seawater temperature.

BRIEF DESCRIPTION OF THE DRAWINGS

FIGS. 5A–5C are graphs illustrating derivatives of the output decision models of FIGS. 4A–4C, respectively;

FIGS. 6A–6C are graphs illustrating derivatives of the output decision models of FIGS. 4A–4C, respectively, in the case where there are upper and lower limits in the outputs of the plants;

FIGS. 11A–11C are graphs illustrating derivatives of the output decision models of FIGS. 10A–10C, respectively, in the case where there are upper and lower limits in the outputs of the plants;

DETAILED DESCRIPTION OF THE PREFERRED EMBODIMENTS

The invention will now be described with reference to the accompanying drawings.

EMBODIMENT 1

Figure 1:
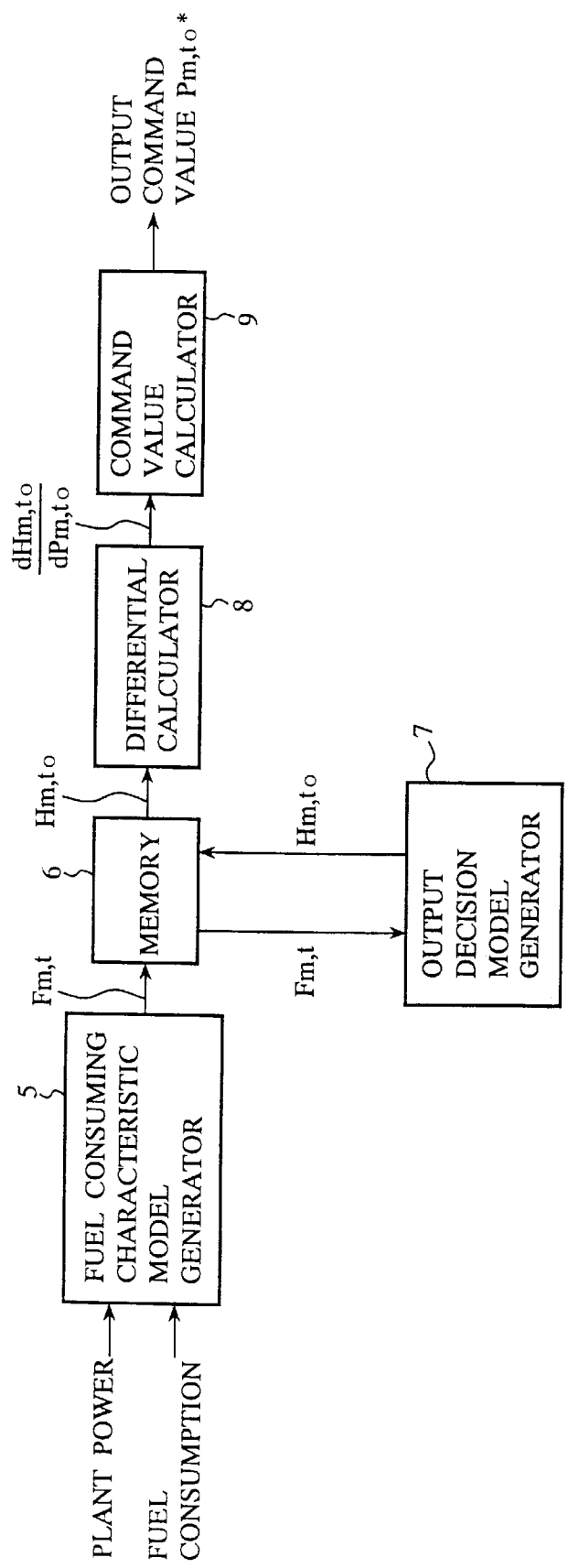
FIG. 1 is a block diagram showing an embodiment 1 of the command value decision unit in accordance with the present invention.

FIG. 1 is a block diagram showing an embodiment 1 of the command value decision unit in accordance with the present invention. In this figure, the reference numeral 5 designate a fuel consuming characteristic model generator (fuel consuming characteristic model generating means) which collects data about fuel consumption $Q_m$ for the output $P_m$ of each of interlinked plants $G_m$, and which generates fuel consuming characteristic models $F_{m,t}$ taking account of the hysteresis characteristics; 6 designates a memory for storing the fuel consuming characteristic models $F_{m,t}$ generated by the fuel consuming characteristic model generator 5 and output decision models $H_{m,t}$ generated by an output decision model generator 7; and 7 designates the output decision model generator which extracts items affecting the fuel consumption $Q_{m,t0}$ of the present time t0 from the fuel consuming characteristic model $F_{m,t}$ associated with each plant $G_m$ to generate the output decision model $H_{m,t0}$ of each plant $G_m$.

The reference numeral 8 designates a differential calculator (differential means) for differentiating the output decision model $H_{m,t0}$ of each plant $G_m$ generated by the output decision model generator 7 by the output $P_{m,t0}$ of the plant $G_m$; and 9 designates a command value calculator (command value calculation means) which calculates the outputs $P_{m,t0}$ of the plants $G_m$ such that the respective derivatives $dH_{m,t0}/dP_{m,t0}$ obtained by the differential calculator 8 coincide under the constraint that the sum total of the outputs $P_{m,t0}$ of the plants $G_m$ agrees with an estimated load amount L, and makes the calculation results as the output command values $P_{m,t0}^*$ of the plants $G_m$.

Incidentally, the plant $G_m$ is a conception including power driven machines like turbines besides plants such as generators.

Next, the operation will be described.

First, the fuel consuming characteristic model generator 5 collects data about the fuel consumption $Q_{m,t}$ of the output $P_{m,t}$ of each of the interlinked plants $G_m$. Thus, if m-plants are interlinked, the data are collected for each of them.

Figure 17:
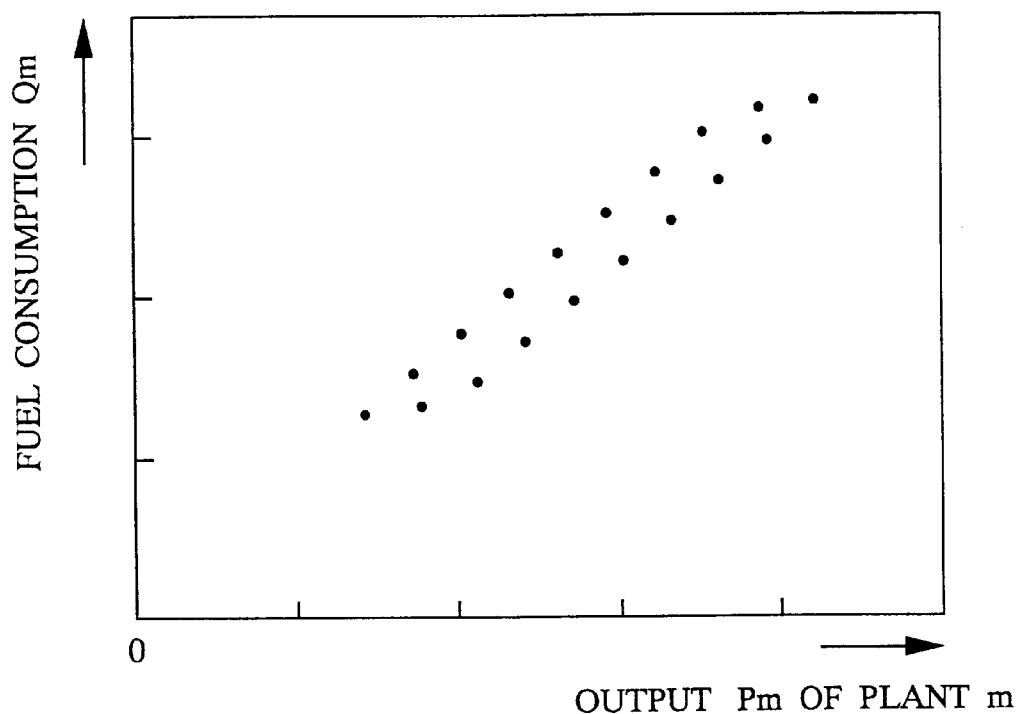
FIG. 17 is a graph illustrating data collected by the command value decision unit for one day from a midnight to the next midnight.
Figure 18:
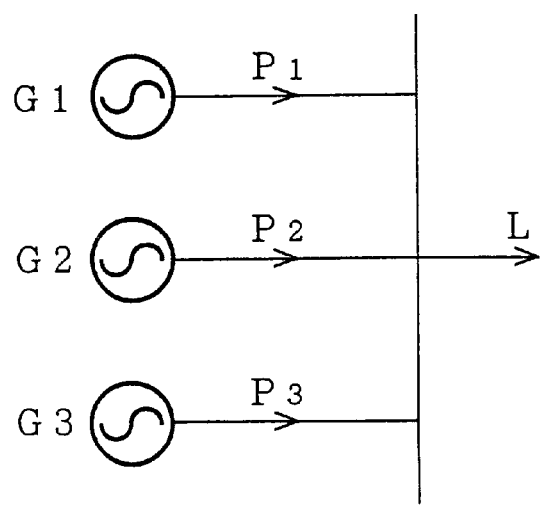
FIG. 18 is a diagram showing interlinked plants associated with the conventional command value decision unit.
Figure 19C:
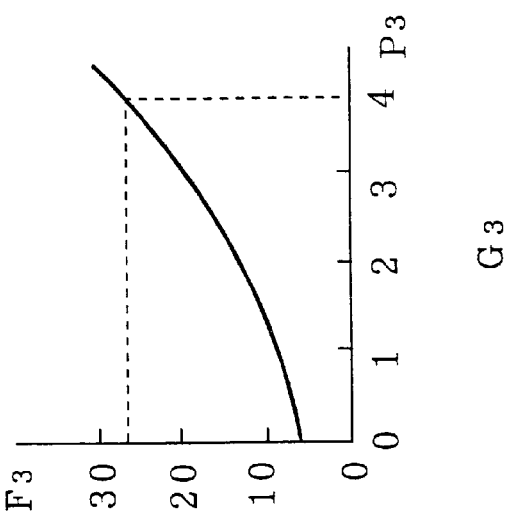
FIGS. 19A–19C are graphs illustrating an example of a fuel consuming characteristic model of the conventional command value decision unit.
Figure 19B:
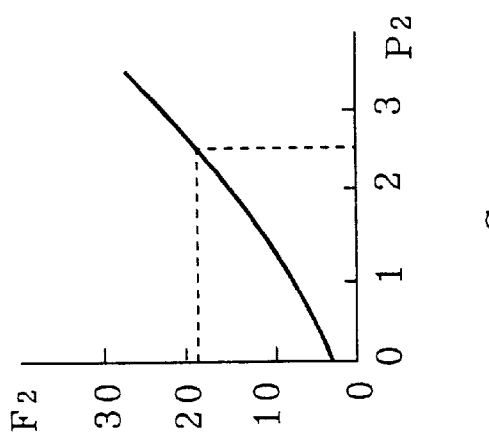
Figure 19A:
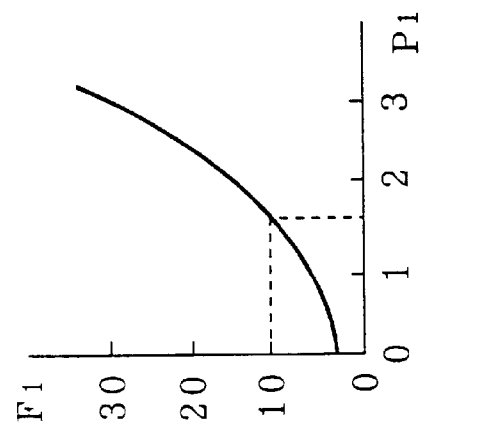
Figure 20C:
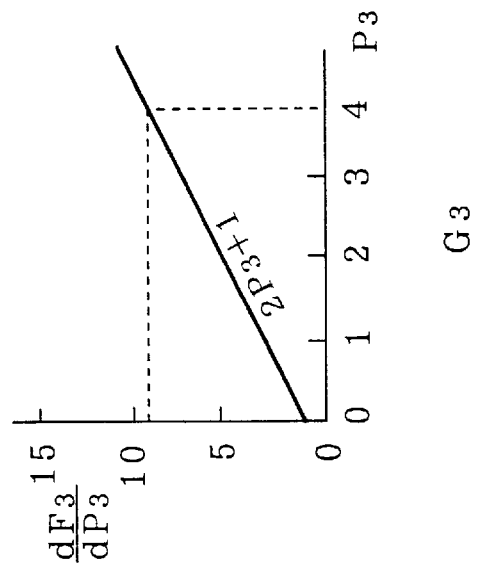
FIGS. 20A–20C are graphs illustrating the derivatives of the fuel consuming characteristic model of FIGS. 19A–19C, respectively.
Figure 20B:
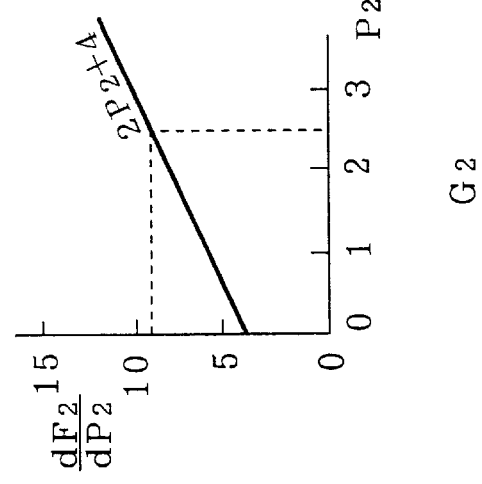
Figure 20A:
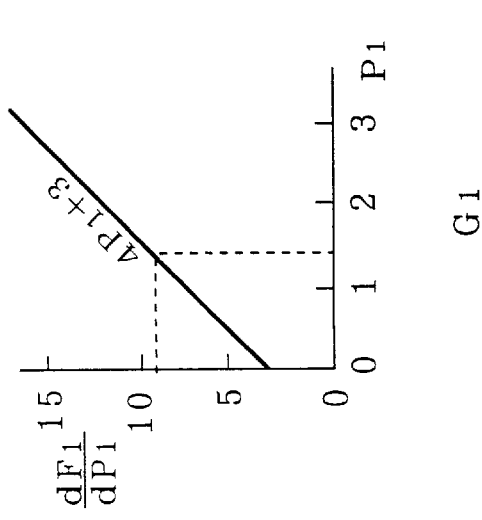

For example, as shown the diagram of FIG. 17, the data are collected in one day from 12 o'clock at night to the next midnight.

The fuel consuming characteristic model generator 5, having collected the data, generates the fuel consuming characteristic model $F_{m,t}$ associated with each plant $G_m$ by modeling the fuel consumption $Q_{m,t}$ for the output $P_{m,t}$ of each plant $G_m$ using a quadratic function considering the hysteresis characteristics, as given by following expression (13).

$$F_{m,t} = Q_{m,t} = \sum_{i=0}^{r1} a_{m,i} \cdot P_{m,t-i}^2 + \sum_{j=0}^{r2} b_{m,j} \cdot P_{m,t-j} + \sum_{K=1}^{r3} c_{m,k} \cdot Q_{m,t-2} + d_m \quad (13)$$

where the values of the coefficients $a_{m,i}$, $b_{m,j}$, $c_{m,k}$ and $d_m$ are determined by the least squares method or the like so that they will best represent the actual characteristics.

Figure 2:
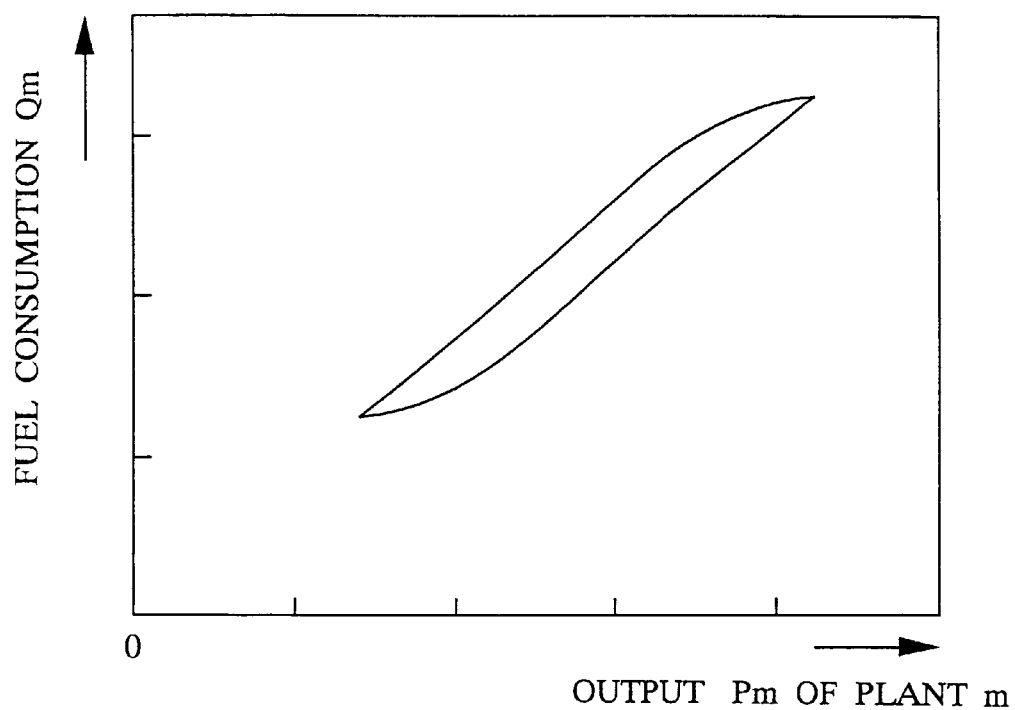
FIG. 2 is a graph illustrating an example of a fuel consuming characteristic model taking account of hysteresis characteristics.
Figure 3:
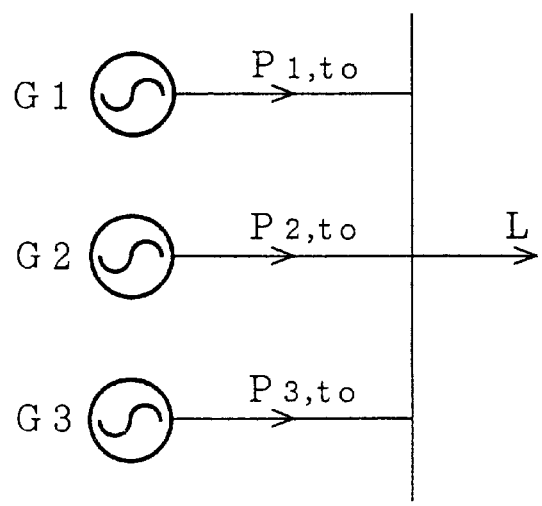
FIG. 3 is a diagram showing interlinked plants.

FIG. 2 is a graph illustrating an example of the fuel consuming characteristic models $F_{m,t}$ considering the hysteresis characteristics. As illustrated in this figure, considering the hysteresis characteristics (output time of the plant), the locus draws a spiral-like curve rather than a monotonically increasing curve.

Once the fuel consuming characteristic model generator 5 has generated the fuel consuming characteristic models $F_{m,t}$ of respective plants $G_m$, the memory 6 stores them. In the following description, it is assumed for brevity and convenience that three plants $G_1$, $G_2$ and $G_3$ are interlinked, and that the fuel consuming characteristic models $F_{m,t}$ of the plants $G_1$, $G_2$ and $G_3$ which consider the hysteresis characteristics are generated under the following conditions. Here, it should be noted that the objective of the calculation is to minimize the sum total of the fuel consumption from the present time $t_0$ to a time $(t_{0+s})$, s sampling periods after the present time (here, it is assumed that s=1 for convenience of explanation).

Conditions for Plant $G_1$ $r_1=0$, $r_2=1$, $r_3=1$ $a_{1,0}=1$ $b_{1,0}=2$, $b_{1,1}=-1$ $c_{1,1}=1$ $d_1=1$ Conditions for Plant $G_2$ $r_1=0$, $r_2=1$, $r_3=1$ $a_{2,0}=2$ $b_{2,0}=1$, $b_{2,1}=-1$ $c_{2,1}=1$ $d_2=2$ Conditions for Plant $G_3$ $r_1=0$, $r_2=0$, $r_3=1$ $a_{3,0}=1$ $b_{3,0}=3$ $c_{3,1}=2$ $d_3=1$ Under these conditions, the fuel consuming characteristic models $F_{m,t}$ expressing the plants $G_1$, $G_2$ and $G_3$s are given as follows:

$$F_{1,t}=P_{1,t}^2+2P_{1,t}-P_{1,t-1}+Q_{1,t-1}+1 \tag{14}$$

$$F_{2,t}=2P_{2,t}^2+P_{2,t}-P_{2,t-1}+Q_{2,t-1}+2 \tag{15}$$

$$F_{3,t}=P_{3,t}^2+3P_{3,t}+2Q_{3,t-1}+1 \tag{16}$$

In addition, the sum totals of the fuel consumptions from the present time $t_0$ to $t_{0+1}$ are given by following equations (17)–(19).

$$\sum_{t=t0}^{t0+1} F_{1,t} = \tag{17}$$
$$F_{1,t0}+F_{1,t0+1} = P_{1,t0}^2+2P_{1,t0}-P_{1,t0-1}+Q_{1,t0-1}+1+P_{1,t0+1}^2+$$
$$2P_{1,t0+1}-P_{1,t0}+Q_{1,t0}+1=$$
$$P_{1,t0+1}^2+P_{1,t0}^2+2P_{1,t0+1}+P_{1,t0}-P_{1,t0-1}+Q_{1,t0}+Q_{1,t0-1}+2=$$
$$P_{1,t0+1}^2+P_{1,t0}^2+2P_{1,t0+1}+P_{1,t0}-P_{1,t0-1}+$$
$$(P_{1,t0}^2+2P_{1,t0}-P_{1,t0-1}+Q_{1,t0-1}+1)+Q_{1,t0-1}+2=$$
$$P_{1,t0+1}^2+2P_{1,t0}^2+2P_{1,t0+1}+3P_{1,t0}-2P_{1,t0-1}+2Q_{1,t0-1}+3$$

$$\sum_{t=t0}^{t0+1} F_{2,t} = F_{2,t0}+F_{2,t0+1} = 2P_{2,t0}^2+P_{2,t0}-P_{2,t0-1}+ \tag{18}$$
$$Q_{2,t0-1}+2+2P_{2,t0+1}^2+P_{2,t0+1}-P_{2,t0}+Q_{2,t0}+2=$$
$$2P_{2,t0+1}^2+2P_{2,t0}^2+P_{2,t0+1}-P_{2,t0-1}+Q_{2,t0}+Q_{2,t0-1}+4=$$
$$2P_{2,t0+1}^2+2P_{2,t0}^2+P_{2,t0+1}-P_{2,t0-1}+$$
$$(2P_{2,t0}^2+P_{2,t0}-P_{2,t0-1}+Q_{2,t0-1}+2)+Q_{2,t0-1}+4=$$
$$2P_{2,t0+1}^2+4P_{2,t0}^2+P_{2,t0+1}+P_{2,t0}-2P_{2,t0-1}+2Q_{2,t0-1}+6$$

$$\sum_{t=t0}^{t0+1} F_{3,t} = F_{3,t0}+F_{3,t0+1} = \tag{19}$$
$$P_{3,t0}^2+3P_{3,t0}+2Q_{3,t0-1}+1+P_{3,t0+1}^2+3P_{3,t0+1}+2Q_{3,t0}+1=$$
$$P_{3,t0+1}^2+P_{3,t0}^2+3P_{3,t0+1}+3P_{3,t0}+2Q_{3,t0}+2Q_{3,t0-1}+2=$$
$$P_{3,t0+1}^2+P_{3,t0}^2+3P_{3,t0+1}+3P_{3,t0}+$$
$$2(P_{3,t0}^2+3P_{3,t0}+2Q_{3,t0-1}+1)+2Q_{3,t0-1}+2=$$
$$P_{3,t0+1}^2+3P_{3,t0}^2+3P_{3,t0+1}^2+9P_{3,t0}+6Q_{3,t0-1}+4$$

Figure 4A:
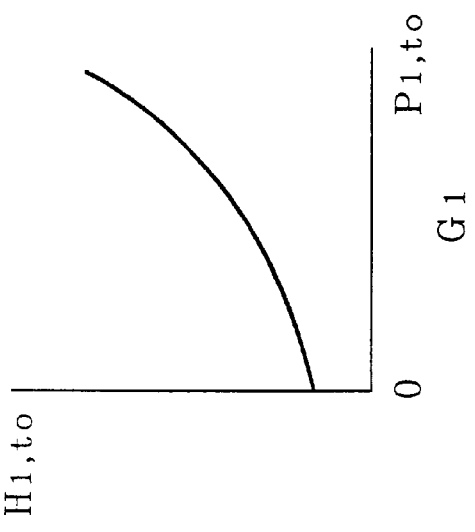
FIGS. 4A–4C are graphs illustrating output decision models of the plants of FIG. 3.
Figure 4B:
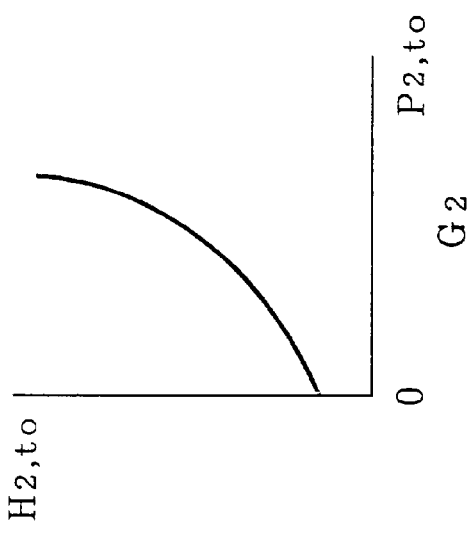
Figure 4C:
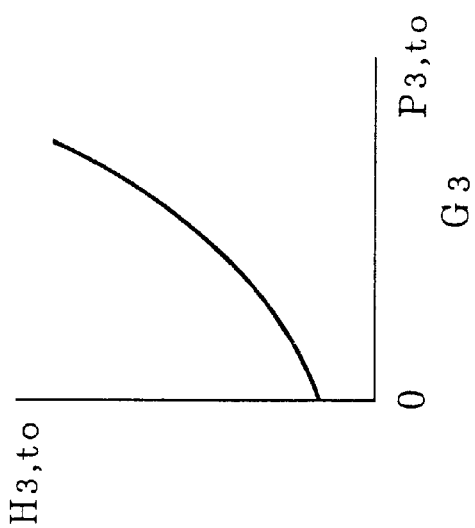

Giving attention to equations (17)–(19), they consist of the terms associated with the time $t_{0-1}$, terms associated with the present time $t_0$ and terms associated with the time $t_{0+1}$. However, since the terms that affect the fuel consumptions at the present time $t_0$ are restricted to the terms associated with the present time $t_0$, the output decision model $H_{m,t0}$ of each plant $G_m$ is generated by extracting the terms associated with the present time $t_0$ from equations (17)–(19) (see, FIGS. 4A–4C).

$$H_{1,t0}=2P_{1,t0}^2+3P_{1,t0}+\text{constant} \tag{20}$$

$$H_{2,t0}=4P_{2,t0}^2+P_{2,t0}+\text{constant} \tag{21}$$

$$H_{3,t0}=3P_{3,t0}^2+9P_{3,t0}+\text{constant} \tag{22}$$

Once the output decision model $H_{m,t0}$ of each plant $G_m$ has been generated in this way, the differential calculator 8 differentiates the output decision model $H_{m,t0}$ of each plant $G_m$ by its output $P_{m,t0}$ (see, FIGS. 5A–5C).

Each of the derivatives represents the increment of the fuel consumption against the increment of the output of each plant.

$$dH_{1,t0}/dP_{1,t0}=4P_{1,t0}+3 \tag{23}$$

$$dH_{2,t0}/dP_{2,t0}=8P_{2,t0}+1 \tag{24}$$

$$dH_{3,t0}/dP_{3,t0}=6P_{3,t0}+9 \tag{25}$$

When the differential calculator 8 has completed the differential calculation, the command value calculator 9 calculates the output command value $P_{m,t0}^*$ of each plant $G_m$ on the basis of the derivatives fed from the differential calculator 8.

If the estimated load amount L is 15,5, for example, the following equation holds because the sum total of the outputs $P_{1,t0}$, $P_{2,t0}$ and $P_{3,t0}$ of the plants $G_1$, $G_2$ and $G_3$ must be 15.5.

$$L=P_{1,t0}+P_{2,t0}+P_{3,t0}=15.5 \tag{26}$$

On the other hand, the sum total of the fuel consumptions of the plants $G_m$ becomes minimum when the increment of the fuel consumption against the increment of the output $P_{m,t0}$ of each plant $G_m$ coincides with that of all the remaining plants under the fixed-incremental fuel cost method.

In other words, the following equations hold because the entire derivatives output from the differential calculator 8 must coincide with one another in order that the respective ratios of increments of the fuel consumption to the increments of the output $P_{m,t0}$s of the plants $G_m$ coincide.

$$dH_{1,t0}/dP_{1,t0} = dH_{2,t0}/dP_{2,t0} = dH_{3,t0}/dP_{3,t0} \tag{27}$$

$$\therefore 4P_{1,t0}+3 = 8P_{2,t0}+1 = 6P_{3,t0}+9$$

Thus, when the outputs $P_{m,t0}$ of the plants $G_m$ satisfy both equations (26) and (27), the estimated load amount L can be achieved with a minimum fuel consumption. Accordingly, we calculate the outputs $P_{m,t0}$ of the plants $G_m$ that satisfy equations (26) and (27).

In this case, the calculation results are $P_{1,t0}=7.5$, $P_{2,t0}=4$ and $P_{3,t0}=4$ so that the outputs $P_{m,t0}$ of the plants $G_m$ are decided as follows, and the minimum fuel consumption $F_{min,t0}$ in this case takes the following value.

$G_1 \rightarrow P_{1,t0}^*=7.5F_{1,t0}=135+\text{constant}$ $G_2 \rightarrow P_{2,t0}^*=4.0F_{2,t0}=68+\text{constant}$ $G_3 \rightarrow P_{3,t0}^*=4.0F_{3,t0}=84+\text{constant}$ $$F_{min,t0}=F_{1,t0}+F_{2,t0}+F_{3,t0}=287+\text{constant} \tag{28}$$

Finally, the command value calculator 9 supplies the plants $G_1$, $G_2$ and $G_3$ with the thus determined output command values $P_{1,t0}^*$, $P_{2,t0}^*$ and $P_{3,t0}^*$ of the plants $G_1$, $G_2$ and $G_3$, completing the processings.

Although the time for obtaining the sum total of the fuel consumption is set at s=1 in the foregoing description, the operation in the case where s is very large, such as s=∞, is as follows. First, the output decision model $H_{m,t0}$ is expressed as equation (29).

$$H_{m,t0} = \frac{\sum_{i=0}^{r1} a_{m,i}}{1 - \sum_{K=1}^{r3} c_{m,k}} \times P_t^2 + \frac{\sum_{j=0}^{r2} b_{m,j}}{1 - \sum_{K=1}^{r3} c_{m,k}} \times P_t + \text{constant} \quad (29)$$

Once the output decision model $H_{m,t0}$ of each plant $G_m$ has been generated, the differential calculator 8 differentiates the output decision model $H_{m,t0}$ of each plant $G_m$ by the output $P_{m,t0}$ of that plant $G_m$ (see, FIGS. 5A–5C), as expressed by equation (30).

$$\frac{dH_{m,t0}}{dP_{m,t0}} = \frac{\sum_{i=0}^{r1} a_{m,i}}{1 - \sum_{K=1}^{r3} c_{m,k}} 2P_t + \frac{\sum_{j=0}^{r2} b_{m,j}}{1 - \sum_{K=1}^{r3} c_{m,k}} \quad (30)$$

Each derivative in equation (30) represents the increment of the fuel consumption against the increment of the output of each plant.

Finally, when the differential calculator 8 has completed the differential calculations, the command value calculator 9 calculates the output command value $P_{m,t0}{}^*$ of each plant $G_m$ on the basis of the derivatives fed from the differential calculator 8 as in the case where S=1, and provides the plants $G_m$ with the output commands, thus completing a series of the processings.

Although s is set at s=∞ for convenience, almost the same results as in s=∞ can be obtained in practice as long as s=10 or so. In addition, the denominator, for example in equation (29), never falls zero in actual plants.

The qualitative meaning of the foregoing equation (29) is as follows. Although equation (13) express a dynamic fuel consuming characteristic model taking account of the hysteresis characteristics, equation (29) expresses a model in a steady state corresponding to the dynamic model expressed by equation (13). In other words, although the model itself possesses the hysteresis characteristics, the fuel consuming characteristic model in its steady state can be expressed by equation (29).

Although the foregoing description do not refer to a possible range of the output of each plant $G_m$ assuming that there is no upper limit $P_{m,max}$ or lower limit $P_{m,min}$ for the output $P_{m,t0}$ of each plant $G_m$, there are upper limit $P_{m,max}$ and lower limit $P_{mmin}$ for the output $P_{m,t0}$ in an actual plant. Thus, we will explain about the case where these limits are present.

First, the output decision model generator 7 generates the output decision model $H_{m,t0}$ of each plant $G_m$ (see, FIGS. 4A–4C), and the differential calculator 8 differentiates the output $P_{m,t0}$ of each plant by the output decision model $H_{m,t0}$ of that plant $G_m$ (see, FIGS. 5A–5C). If the possible output range of each plant $G_m$ is from two to six, that is, if the lower limit $P_{m,min}$ is two and the upper limit $P_{m,max}$ is six, the output command value $P_{1,t0^*}$ of the plant $G_1$ deviates from the possible output range because the output command value $P_{1,t0}{}^*$ of the plant $G_1$ has been determined at 7.5 in the foregoing example. Thus, it cannot achieve the estimated load amount L, and the output command value $P_{m,t0}{}^*$ of each plant $G_m$ becomes an inappropriate value.

To deal with such a case, the differential calculator 8 replaces, as shown in FIGS. 6A–6C, the derivatives corresponding to the upper limit $P_{m,max}$ and lower limit $P_{m,min}$ by the infinite outside the possible output range to carry out composition of the derivatives after the replacement.

Figure 8:
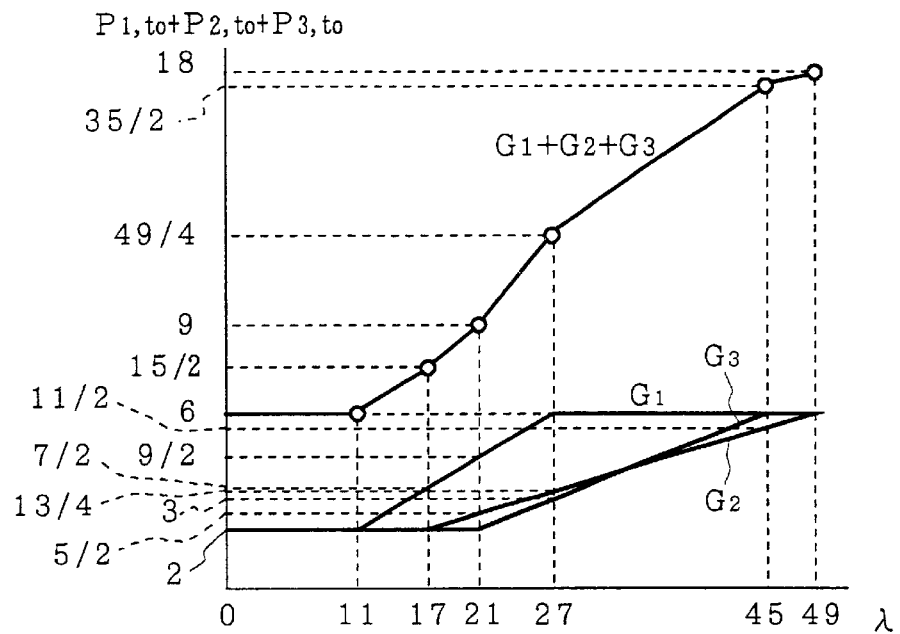
FIG. 8 is a graph illustrating the composition result of the inverse functions of FIGS. 7A–7C.
Figure 9:
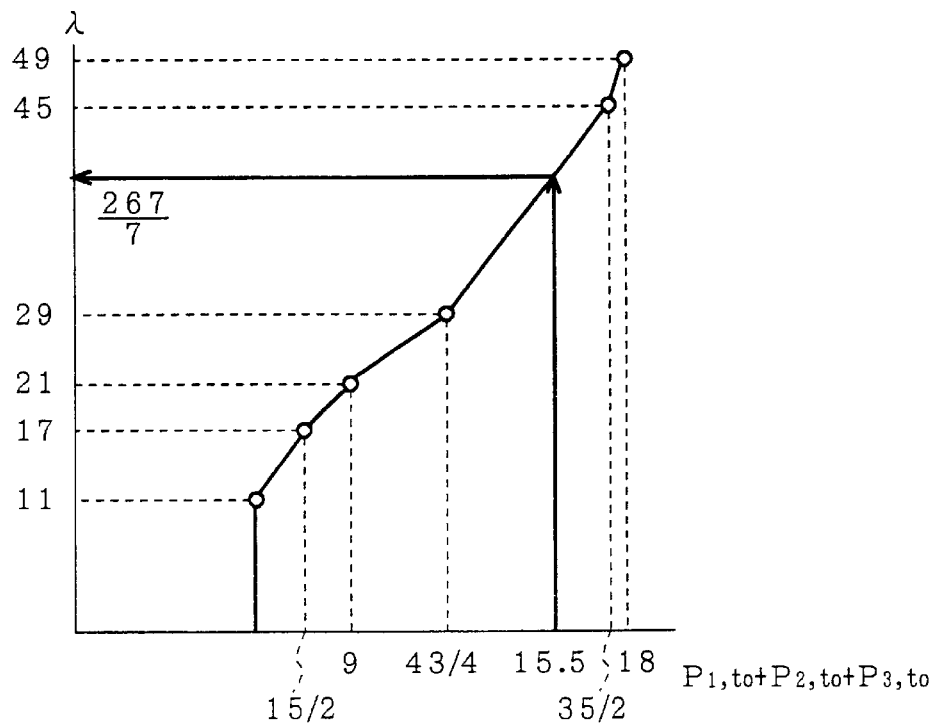
FIG. 9 is a graph illustrating the composition result of the derivatives of FIGS. 6A–6C.

More specifically, after obtaining the inverse functions of the derivatives after the replacement (see, FIGS. 7A–7C), the differential calculator 8 carries out the composition of the inverse functions (see, FIG. 8), and finally obtains the inverse function of the composition result, thereby obtaining the composition result of the replaced derivatives (see, FIG. 9). The following are an explanation of these procedures using equations.

$$P_{1,t0}=\lambda_1/4-\tfrac{3}{4} \quad (31)$$

$$P_{2,t0}=\lambda_2/8-\tfrac{1}{8} \quad (32)$$

$$P_{3,t0}=\lambda_3/6-\tfrac{3}{2} \quad (33)$$

where $\lambda_1=dH_{1,t0}/dP_{1,t0}$ $\lambda_2=dH_{2,t0}/dP_{2,t0}$ $\lambda_3=dH_{3,t0}/dP_{3,t0}$ After the differential calculator 8 has carried out the composition of the derivatives after the replacement, the command value calculator 9 obtains from the composition results the value of the composite derivative that satisfies equation (26) (estimated load amount L=15.5), and obtains the outputs $P_{m,t0}$ of the plants $G_m$ by substituting the differential value 267/7 into $\lambda_1$, $\lambda_2$ and $\lambda_3$ of equations (31)–(32).

$$P_{1,t0}=\lambda_1/4-\tfrac{3}{4}=8.8$$

$$P_{2,t0}=\lambda_2/8-\tfrac{1}{8}=4.6$$

$$P_{3,t0}=\lambda_3/6-\tfrac{3}{2}=4.9$$

Figure 7A:
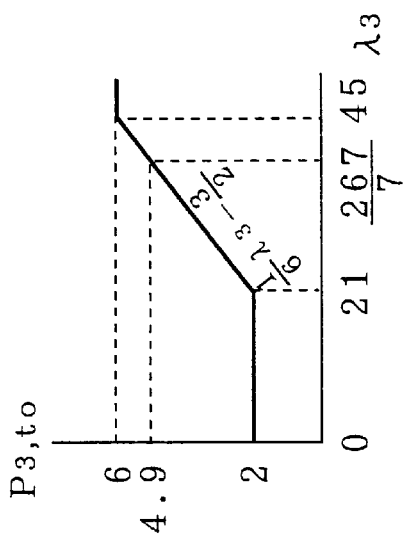
FIGS. 7A–7C are graphs each illustrating inverse functions of the derivatives of FIGS. 6A–6C, respectively.
Figure 7B:
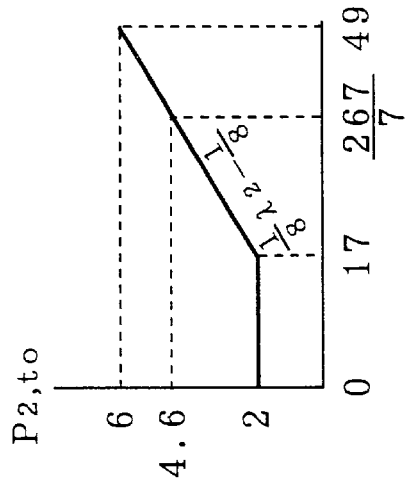
Figure 7C:
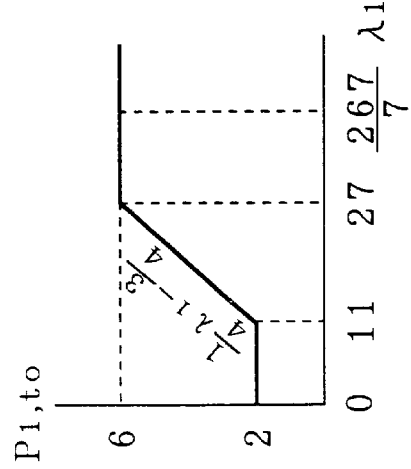

Since the output $P_{1,t0}$ of the plant $G_1$ exceeds the upper limit $P_{m,max}$, it is reset at $P_{1,t0}=6$ as shown in FIG. 7A.

Thus, the output $P_{m,t0}$ of each plant $G_m$ is determined as follows.

$$G_1 \rightarrow P_{1,t0}{}^*=6.0$$

$$G_2 \rightarrow P_{2,t0}{}^*=4.6$$

$$G_3 \rightarrow P_{3,t0}{}^*=4.9$$

Although only the possible output range of each plant $G_m$ is explained in the foregoing, the actual plant has constraint on an output changing rate per unit time: an upper limit $D_{m,max}$ is present when the output is increasing; and a lower limit $D_{m,min}$ is present when the output is decreasing. The following explains the way how to handle the case in which such constraint on the output changing rate is present.

Assuming that the output at the present time t is $P_{m,t}$, the upper and lower limits of the possible output range at the next time are replaced by those expressed by equations (34) and (35).

$$P_{m,max}(t+1)=\min\{P_{m,max}, P_{m,t}+D_{m,max}\} \quad (34)$$

$$P_{m,min}(t+1)=\max\{P_{m,min}, P_{m,t}-D_{m,min}\} \quad (35)$$

Thus, the constraint on the output changing rate can be handled by rep-acing it by the possible output range $P_{m,max}(t+1)$ and $P_{m,min}(t+1)$ at the next time t+1.

According to the embodiment 1, the output decision model $H_{m,t0}$ of each plant $G_m$ is generated by extracting the items that affect the fuel consumption at the present time $t_0$ from among the fuel consuming characteristic model $F_{m,t}$ of each plant $G_m$ taking account of the hysteresis characteristics, and the output command value $P_{m,t0}^*$ of the plant $G_m$ is decided on the basis of the output decision model $H_{m,t0}$. This has an advantage of making it possible to decide at high accuracy the output command value $P_{m,t0}^*$ of each plant that will minimize the sum total of the fuel consumption of each plant.

In addition, when the output $P_{m,t0}$ of each plant $G_m$ is limited by the upper limit $P_{m,max}$ and lower limit $P_{m,min}$, the derivatives corresponding to these values are replaced by the infinite. This has an advantage of limiting the output command value $P_{m,t0}^*$ of each plant $G_m$ within the possible output range, and hence of deciding the appropriate output command value $P_{m,t0}^*$. Furthermorls, when the output changing rate of each plant is limited by the upper limit $D_{m,max}$ and lower limit $D_{m,min}$, the output range of the plant is replaced by the values corresponding to the upper limit and lower limit. This has an advantage of limiting the output command value $P_{m,t0}^*$ of each plant $G_m$ within the possible output range, thereby making it possible to decide the appropriate output command value $P_{m,t0}^*$.

EMBODIMENT 2

Figure 10A:
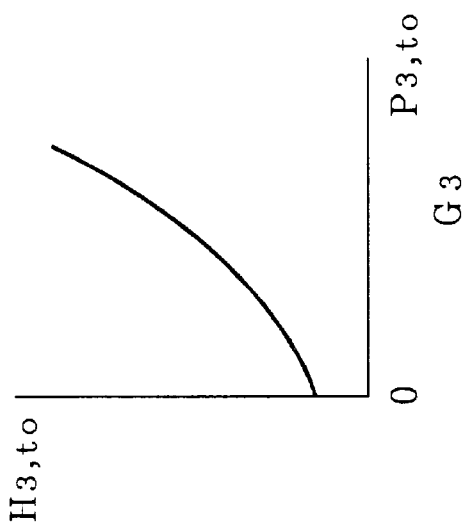
FIGS. 10A–10C are graphs illustrating other output decision models of the plants of FIG. 3, which include a derivative section with a negative slope.
Figure 10B:
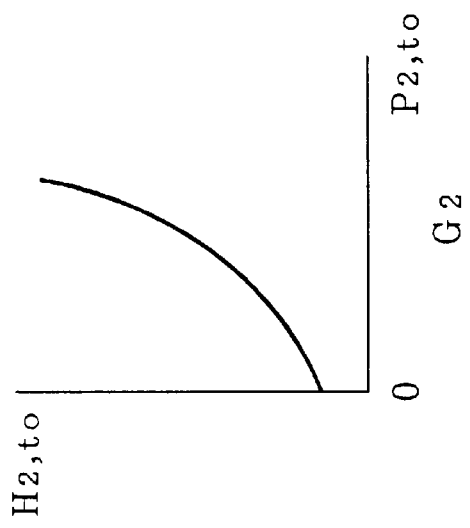
Figure 10C:
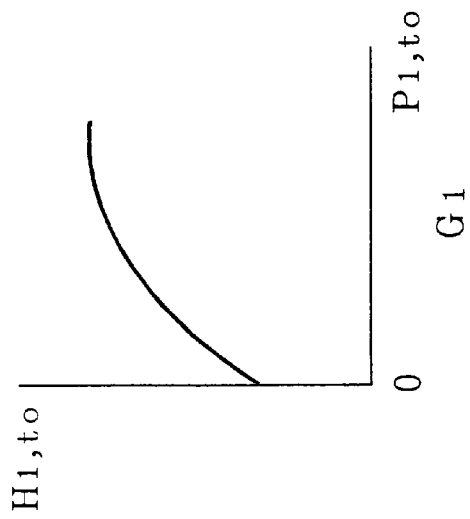

The embodiment 1 described above handles the case where the increment of the fuel consumption increases with the increment of the output $P_{m,t0}$ of each plant $G_m$ (see, FIGS. 6A–6C). In other words, it handles only the case where the slopes of the derivatives are always positive. If there is a plant whose slope of the derivative includes a negative value as shown in FIGS. 10A and 11A, the fixed-incremental fuel cost method cannot be applied simply because it is only applicable to the case where the slopes of the derivatives are always positive (inclusive of zero). Thus, the output command value $P_{m,t0}^*$ of the plant $G_m$ cannot be obtained.

Figure 12C:
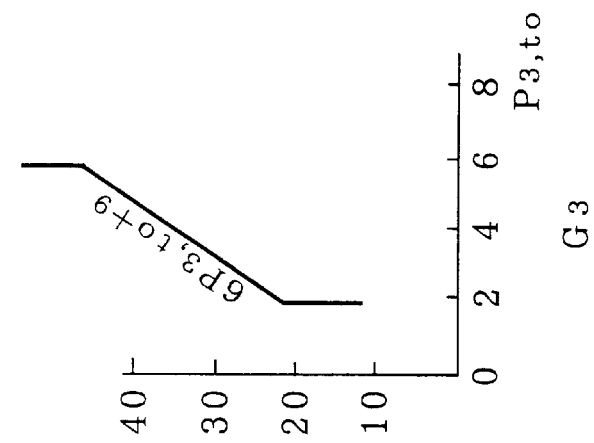
FIGS. 12A–12C are graphs illustrating derivatives of the output decision models of FIGS. 11A–11C, respectively, in which the negative slope portion of the derivative is replaced with a fixed value.
Figure 12B:
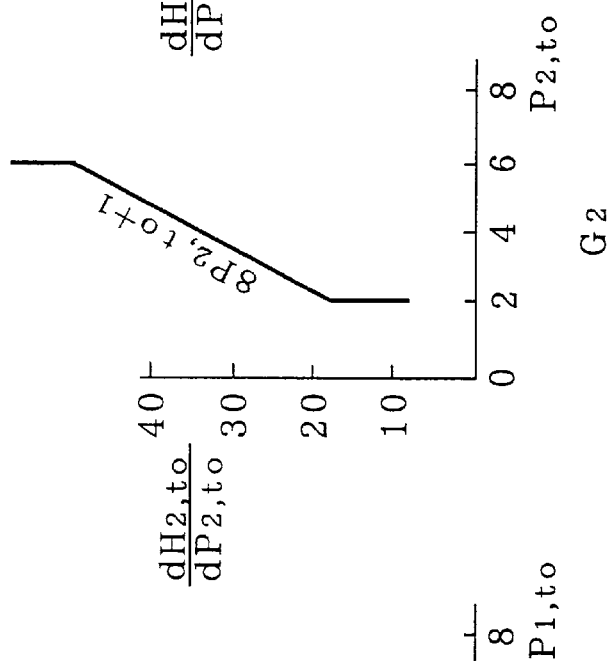
Figure 12A:
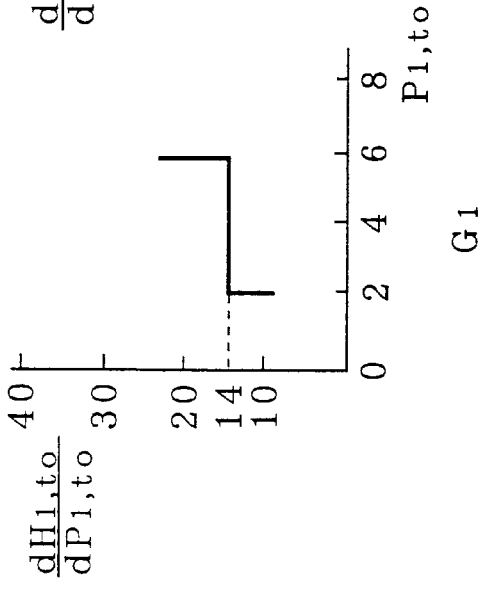

In view of this, when the slope of the derivative is negative as in the plant $G_1$, that derivative is replaced by a fixed value as illustrated in FIG. 12A in the present embodiment 2.

For example, when the slope of the derivative associated with the plant $G_1$ takes a negative value, the differential calculator 8 obtains the average value $P_{1,avg}$ of the derivatives corresponding to the upper limit $P_{1,max}$ and lower limit $P_{1,min}$ as follows, and replaces the derivatives by the average value $P_{1,avg}$.

$$P_{1,avg} = (\tfrac{1}{2}) \times \{(dH_{1,t0}/dP_{1,t0})|P_{m,max} + (dH_{1,t0}/dP_{1,t0})|P_{m,min}\} = (\tfrac{1}{2}) \times (22+6) = 14$$

This makes it possible to determine the output command value $P_{m,t0}^*$ of each plant $G_m$ by the fixed-incremental fuel cost method even if there is a plant in which the slope of the derivative takes a negative value.

EMBODIMENT 3

The foregoing embodiment 1 explains the case where the output $P_{m,t0}$ of the plant $G_m$ has the upper limit $P_{m,max}$ and lower limit $P_{m,min}$ mainly from the viewpoint that they are determined by the performance of the plant. However, the upper limit $P_{m,max}$ and lower limit $P_{m,min}$ can be handled from a viewpoint of the influence on the environment involved in the operation of the plant.

For example, when the plant is a heat power plant, and a tolerance limit is set to carbon dioxide, $SO_x$, $NO_x$ or the like, it is possible to achieve the tolerance limit by setting the upper limit $P_{m,max}$ of the output $P_{m,t0}$ of the plant $G_m$ at a value corresponding to the tolerance limit.

This can limit to a minimum the degradation of the environment involved in the plant operation.

EMBODIMENT 4

The foregoing embodiment 3 handles the influence on the environment involved in the plant operation in the form of the upper limit $P_{m,max}$ and lower limit $P_{m,min}$ of the output $P_m$ to of each plant $G_m$. This problem can also be handled by generating the fuel consuming characteristic model $F_{m,t}$ by the fuel consuming characteristic model generator 5 taking account of the influence of the plant operation on the environment.

For example, increasing the values of the coefficients $a_{m,i}$, $b_{m,j}$, $c_{m,k}$ and $d_m$ of the fuel consuming characteristic model $F_{m,t}$ from those of the embodiment 1 enables the output $P_{m,t0}$ of each plant $G_m$ to be suppressed.

This can limit to a minimum the degradation of the environment involved in the plant operation.

EMBODIMENT 5

Although the foregoing embodiment 3 explains the case in which the influence of the plant operation on the enviromment is handled in the form of the upper limit $P_{m,max}$ and lower limit $P_{m,min}$ of the output $P_{m,t0}$ of each plant $G_m$, if there is constraint on the values of energy flowing through the lines linking a plurality of plants, the constraint on the energy values can also be handled in the form of the upper limit $P_{m,max}$ and lower limit $P_{m,min}$ of the plant output.

Figure 13:
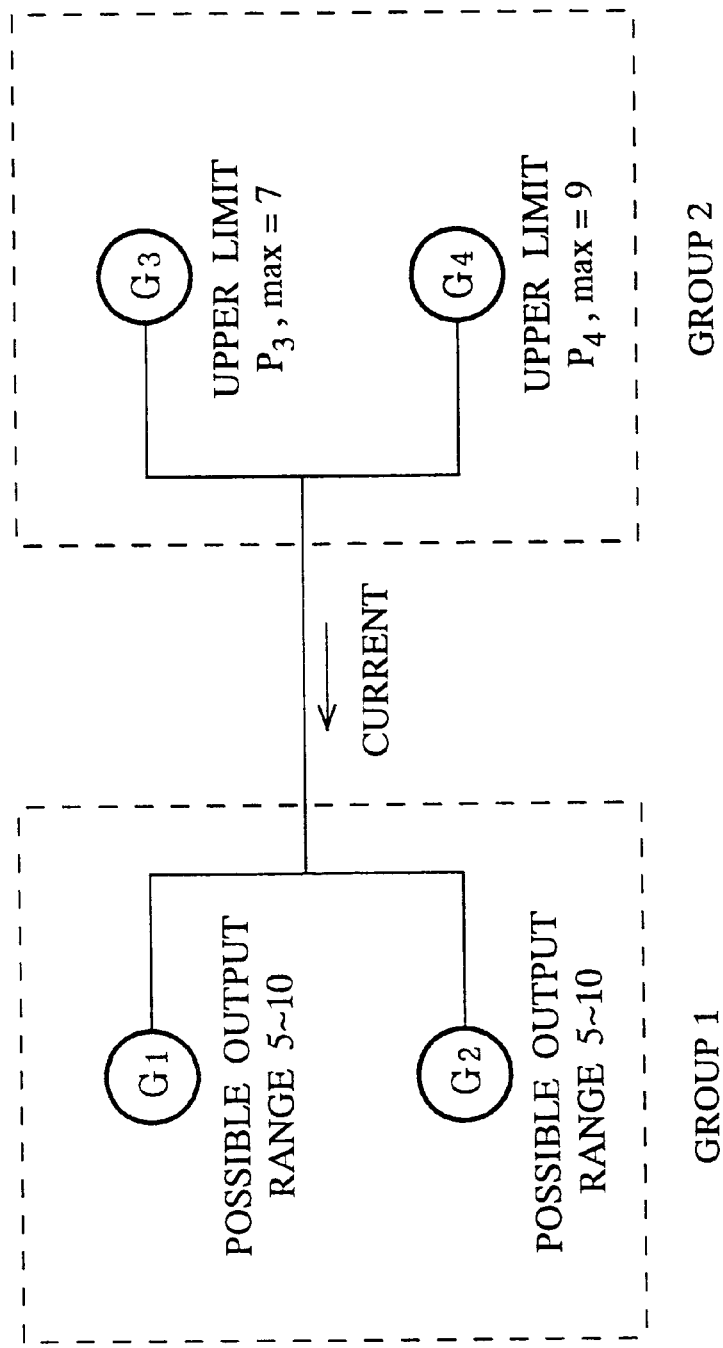
FIG. 13 is a diagram showing interlinked plants.

For examples, consider the case where four plants $G_1$–$G_4$ are interconnected in an electric power system as shown in FIG. 13, and whaere the possible output range of each of the plants $G_1$ and $G_2$ in the first group is from five to ten, and the plants $G_1$ and $G_2$ of the first group falls inoperable if the received current by the plants $G_1$ and $G_2$ exceeds six. In this system, if the output of the plant $G_1$ and $G_2$ in the first group are set at five, respectively, the total output of the first group is ten, and hence if the total output of the second group exceeds 16, the plants $G_1$ and $G_2$ will fall inoperable.

Accordingly, the upper limit $P_{3,max}$ of the output of the plant $G_3$ and the upper limit $P_{4,max}$ of the output of the plant $G_4$ are set so that the total output of the second group does riot exceed 16 (for example, if the upper limit $P_{3,max}$ of the output of the plant $G_3$ is set at seven, the upper limit $P_{4,max}$ of the output of the plant $G_4$ can be set at nine).

This offers an advantage that the output command value $P_{m,t0}^*$ of each plant $G_m$ can be determined even if there is constraint on the current flowing through the transmission lines interconnecting the plurality of plants.

EMBODIMENT 6

Although the foregoing embodiment 5 explains the case where the command value calculator 9 determines the output command value $P_{m,t0}^*$ of each plant $G_m$ after replacing the constraint on the energy values by the upper limit $P_{m,max}$ and lower limit $P_{m,min}$, the output command value $P_{m,t0}^*$ of each plant $G_m$ can also be corrected as follows. First, the output command value $P_{m,t0}^*$ of each $G_m$ is temporarily determined ais in the embodiments 1–4, and a decision is made whether it satisfies the constraint on the energy value or not. If a plant that does not satisfy the constraint on the energy value is included in a particular group, the sum total of the outputs of all the plants in that group is calculated. Then, the constraint is transformed and assigned to the upper limit $P_{m,max}$ and lower limit $P_{m,min}$ of the sum total to correct the output command values $P_{m,t0}^*$ of the plants $G_m$ in the group.

For example, if the plant $G_3$ does not satisfy the constraint on the energy value, the constraint is assigned to the upper limit $P_{m,max}$ and lower limit $P_{m,min}$ of the output (the sum total of the outputs of the plants $G_3$ and $G_4$) of the second group, and then the output command value $P_{m,t0}^*$ of each plant $G_m$ is corrected.

This offers an advantage that the output command value $P_{m,t0}^*$ of each plant $G_m$ can be determined even if there is constraint on the value of the energy flowing through the lines interconnecting the plurality of plants.

EMBODIMENT 7

Figure 14:
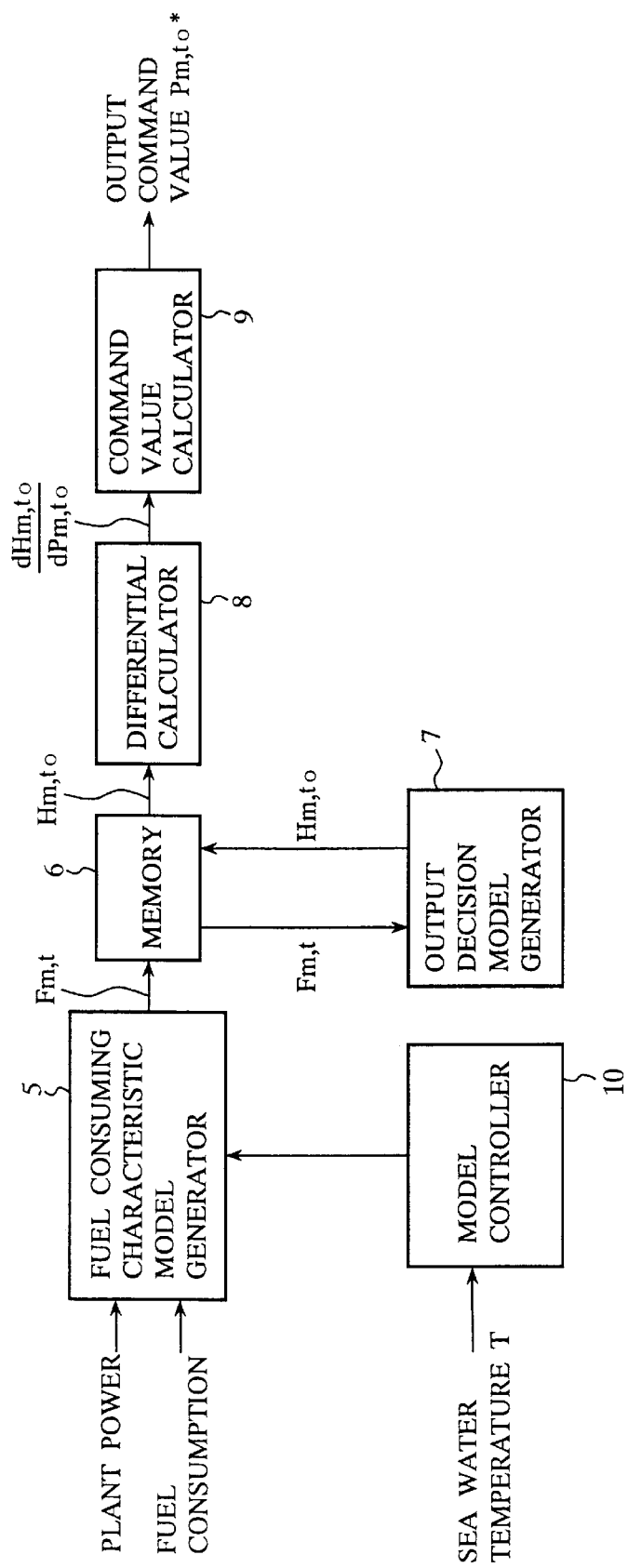
FIG. 14 is a block diagram showing an embodiment 7 of the command value decision unit in accordance with the present invention.

FIG. 14 is a block diagram showing an embodiment 7 of the command value decision unit in accordance with the present invention, in which the same reference numerals designate the same or corresponding portions as those in FIG. 1, and hence the description thereof is omitted here.

In this figure, the reference numeral 10 designates a model controller which monitors seawater temperature T for cooling the steam used as the power of the plant, and which controls the fuel consuming characteristic model $F_{m,t}$ in accordance with the seawater temperature T.

Next, the operation will be described.

Only the operation of the fuel consuming characteristic model generator 5 and model controller 10 will be described because the remaining portions are the same as their counterparts of the embodiments 1–6.

Although the fuel consuming characteristic model generator 5 generates the fuel consuming characteristic model $F_{m,t}$ as in the embodiment 1, the fuel consuming characteristic model generator 5 of this embodiment 7 generates the fuel consuming characteristic model $F_{m,t}$ of following equation (36) rather than that of equation (13).

$$F_{m,t} = Q_{m,t} = \sum_{i=0}^{r1} a_{m,i}(T) \cdot P_{m,t-i}^2 + \sum_{j=0}^{r2} b_{m,j}(T) \cdot P_{m,t-j} + \sum_{K=1}^{r3} c_{m,k}(T) \cdot Q_{m,t-k} + d_m(T) \tag{36}$$

where the values of the coefficients $a_{m,i}(T)$, $b_{m,j}(T)$, $c_{m,k}(T)$ and $d_m(T)$ are determined by the least squares method or the like so that they will best represent the actual characteristics.

The fuel consuming characteristic model $F_{m,t}$ of equation (36) differs from that of equation (13) in that it takes account of the seawater temperature T.

The model controller 10 monitors the seawater temperature T, and varies the coefficients $a_{m,i}(T)$ and others in accordance with the seawater temperature T to control the fuel consuming characteristic model $F_{m,t}$.

This offers an advantage of improving the accuracy of the output command value $P_{m,t0}*$ of each plant $G_m$ because appropriate fuel consuming characteristic model $F_{m,t}$ is obtained in spite of changes in the seawater temperature T.

EMBODIMENT 8

Figure 15:
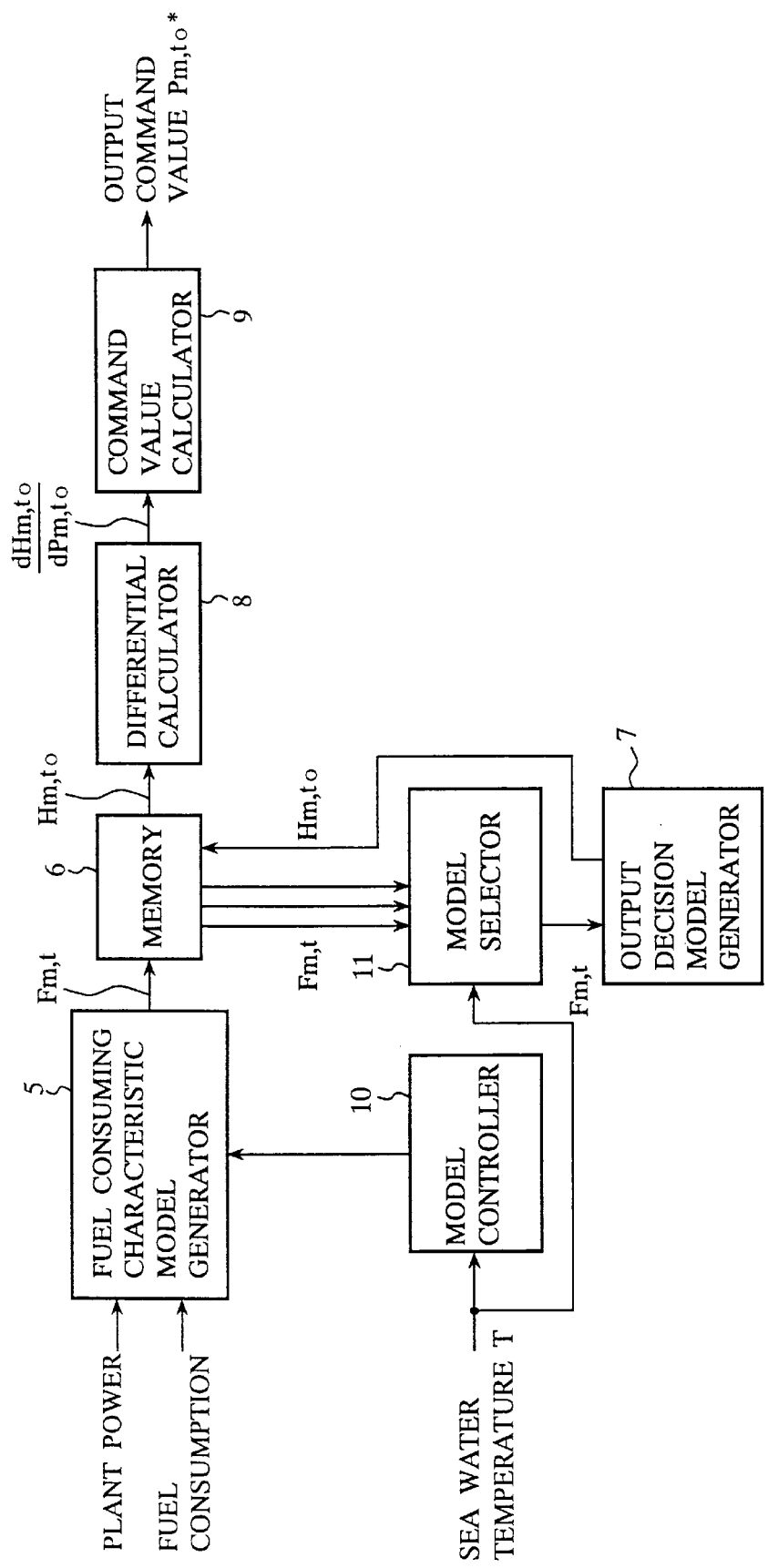
FIG. 15 is a block diagram showing an embodiment 8 of the command value decision unit in accordance with the present invention.
Figure 16:
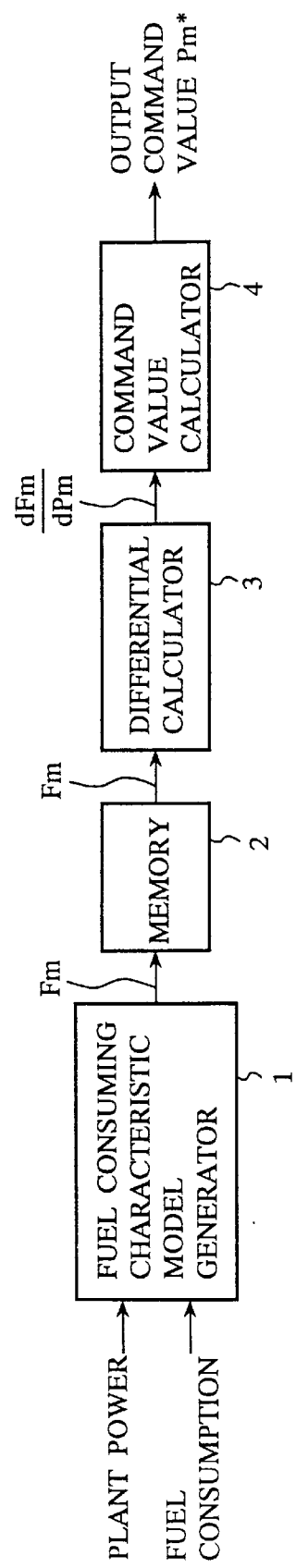
FIG. 16 is a block diagram showing a conventional command value decision unit.

FIG. 15 is a block diagram showing an embodiment 8 of the command value decision unit in accordance with the present invention. In this figure, since the same reference numerals as those of FIG. 14 designate the same or corresponding portions, the description thereof is omitted here.

The reference numeral 11 designate a model selector (model selecting means). When the fuel consuming characteristics model generator 5 generates for a single plant a plurality of fuel consuming characteristic models $F_{m,t}$ in accordance with the seawater temperature T, the model selector monitors the temperature T, selects the fuel consuming characteristic model $F_{m,t}$ in accordance with the temperature T, and supplies the selected one to the output decision model generator 7.

Next, the operation of the present embodiment will be described.

Although the fuel consuming characteristic model $F_{m,t}$ is controlled in accordance with the seawater temperature T in the foregoing embodiment 7, this is sometimes not enough to obtain the appropriate fuel consuming characteristic model $F_{m,t}$ because ths seawater temperature T greatly differs in summer and in winter, for example.

In view of this, in the present embodiment 8, the fuel consuming characteristic model generator 5 generates a plurality of fuel consuming characteristic models $F_{m,t}$ in accordance with the seawater temperature T for the same single plant (generates the fuel consuming characteristic models $F_{m,t}$ for the respective seawater temperatures 0° C., 10° C. and 20° C., for example).

When the fuel consuming characteristic model generator 5 generates a plurality of fuel consuming characteristic models $F_{m,t}$, the model selector 11, monitoring the seawater temperature T, selects one of the fuel consuming characteristic models $F_{m,t}$ in accordance with the seawater temperature T, and supplies the selected one to the output decision model generator 7.

For example, if the seawater temperature is 12° C., the model selector 11 selects the fuel consuming characteristic model $F_{m,t}$ for 10° C. seawater temperature, and if the seawater temperature is 16° C., it selects the fuel consuming characteristic model $F_{m,t}$ for 20° C. seawater temperature.

This offers an advantage of achieving a highly accurate output command value $P_{m,t0}*$ of each plant $G_m$ even if the seawater temperature T varies greatly depending on the seasons.

EMBODIMENT 9

Although the fuel consuming characteristic model $F_{m,t}$ is selected in accordance with the seawater temperature T in the foregoing embodiment 8, when the fuel consuming characteristic model generator 5 generates a plurality of fuel consuming characteristic models $F_{m,t}$ for the same plant, the model selector 11 can select the best fit fuel consuming characteristic model $F_{m,t}$ by considering matching quality of the fuel consuming characteristic models on the basis of the number of data, the number of parameters and the sum of the estimated errors, which are associated with the fuel consuming characteristic models $F_{m,t}$.

More specifically, the model selector 11 carries out the following calculation on the basis of the number of data, the number of parameters and estimated errors, which are associated with each fuel consuming characteristic model $F_{m,t}$, and selects the fuel consuming characteristic model $F_{m,t}$ whose calculation result AIC is minimum as the best fit fuel consuming characteristic model $F_{m,t}$.

AIC=the number of data×log$_e$(sum of estimated errors/number of data)+2(number of parameters)  (37)

where the number of data is the number of fuel consumption $Q_{m,t}$ for the plant output $P_{m,t}$ collected for each plant $G_m$, estimated errors are data errors estimated for model values, and the number of parameters are the number of variables such as $P_{m,t-12}$ in equations (13) and (36).

This offers an advantage of achieving a more accurate output command value $P_{m,t0}*$ of each plant $G_m$ because the best fit fuel consuming characteristic model $F_{m,t}$ can be selected when the fuel consuming characteristic model generator 5 generates a plurality of the fuel consuming characteristic models $F_{m,t}$ using different methods or parameters as the fuel consuming characteristic models $F_{m,t}$ of the same plant.

EMBODIMENT 10

Although the fuel consuming characteristic model $F_{m,t}$ is selected in accordance with the seawater temperature T in the foregoing embodiment 8, when the fuel consuming characteristic model generator 5 can generate a plurality of fuel consuming characteristic models $F_{m,t}$ as those of the same plant in accordance with the fuel used by the plant, the fuel consuming characteristic model $F_{m,t}$ can be selected in accordance with the type of fuel in current use by monitoring it.

More specifically, the fuel consuming characteristic model generator 5 generates a plurality of fuel consuming characteristic models $F_{m,t}$ for the same plant in accordance with the types of the fuel used by the plant (for example, generates the fuel consuming characteristic models $F_{m,t}$ for heavy oil, light oil and gas)

When the fuel consuming characteristic model generator 5 has generated a plurality of the fuel consuming characteristic models $F_{m,t}$, the model selector 11, monitoring the fuel currently used by the plant, selects the fuel consuming characteristic model $F_{m,t}$ in accordance with the fuel used by the plant, and supplies the selected one to the output decision model generator 7.

For example, when the plant uses the heavy oil, the model selector 11 selects the fuel consuming characteristic model $F_{m,t}$ for the heavy oil.

This offers an advantage of achieving a highly accurate output command value $P_{m,t0}^*$ of each plant $G_m$ because the fuel consuming characteristic model $F_{m,t}$ matching the used fuel can be selected in the case where the plants can change their fuel.

EMBODIMENT 11

Although the fuel consuming characteristic model $F_{m,t}$ is selected in accordance with the seawater temperature T in the foregoing embodiment 8, when the fuel consuming characteristic model generator 5 can generate a plurality of fuel consuming characteristic models $F_{m,t}$ for the same plant in accordance with the number of burners used by the plant, one of the fuel consuming characteristic models $F_{m,t}$ can be selected in accordance with the number of burners in current use by monitoring it.

More specifically, the fuel consuming characteristic model generator 5 generates in advance a plurality of fuel consuming characteristic models $F_{m,t}$ in accordance with the number of burners used by the plant as the fuel consuming characteristic models $F_{m,t}$ of the same plant (for example, generates the fuel consuming characteristic models $F_{m,t}$ for 40 and 50 burners, respectively). Once the fuel consuming characteristic model generator 5 has generated the plurality of the fuel consuming characteristic models $F_{m,t}$, the model selector 11, monitoring the number of burners currently used by the plant, selects one of the fuel consuming characteristic models $F_{m,t}$ in accordance with the number of burners used by the plant, and supplies the selected one to the output decision model generator 7.

For example, when the number of the burners currently used by the plant is 48, the model selector 11 selects the fuel consuming characteristic model $F_{m,t}$ for the 50 burners.

This offers an advantage of achieving a highly accurate output command value $P_{m,t0}^*$ of each plant $G_m$ because the fuel consuming characteristic model $F_{m,t}$ matching the number of burners currently used by the plant can be selected in the case where the plants can change the number of their burners.

EMBODIMENT 12

Although the foregoing embodiments 1–11 do not refer to the regeneration of the fuel consuming characteristic model $F_{m,t}$ by the fuel consuming characteristic model generator 5 after it has been once generated, it can be regenerated by monitoring the output $P_{m,t}$ of each plant $G_m$ and fuel consumption $Q_m$ and by detecting the errors between them and the fuel consuming characteristic model $F_{m,t}$ so that the fuel consuming characteristic model $F_{m,t}$ is reformed in accordance with the errors.

This offers an advantage of achieving highly accurate output command value $P_{m,t0}^*$ of each plant because more accurate fuel consuming characteristic model $F_{m,t}$ can be obtained.

What is claimed is:

1. A command value decision unit for use in constructing and controlling a plant model to reduce operation expenses comprising:

fuel consuming characteristic model generator for generating a fuel consuming characteristic model for each one of a plurality of interlinked plants, said model taking account of hysteresis characteristics of each of said plants;

output decision model generator for generating a static output decision model of each of said plants by extracting from said fuel consuming characteristic model items that affect a fuel consumption only at a present time;

a differentiator for differentiating said output decision model of each of said plants by an output of each of said plants; and command value calculator for calculating an output of each of said plants under conditions that a sum total of the outputs of the plants at the present time coincides with an estimated load amount, and that derivatives obtained by said differentiator coincide with one another, and for setting each one of calculation results as an output command value of each of said plants, wherein said output command value is used in constructing and controlling a plant model.

2. The command value decision unit as claimed in claim 1, wherein said differentiator replaces derivatives corresponding to said upper limit and lower limit by an infinite when at least one output of said plants has an upper limit and a lower limit.

3. The command value decision unit as claimed in claim 2, wherein said differentiator replaces the derivative by a fixed value when a slope of the derivative is negative.

4. The command value decision unit as claimed in claim 1, wherein said command value calculator assigns a constraint on a value of energy to upper and lower limits of the output command value, and corrects the output command value of the plant if the calculated output command value of the plant goes beyond at least one of the upper and lower limits, said energy flowing through a line interlinking the plurality of plants.

5. The command value decision unit as claimed in claim 1, further comprising a model selector for selecting a best fit fuel consuming characteristic model and supplying said best fit fuel consuming characteristic model to said output decision model generator, wherein said fuel consuming characteristic model generator generates a plurality of fuel consuming characteristic models for a same plant, wherein said model selector selects the best fit fuel consuming characteristic model from said plurality of fuel consuming characteristic models by estimating matching quality of respective fuel consuming characteristic models taking account of a number of data, a number of parameters and a sum of estimated errors associated with each of said fuel consuming characteristic models.

6. The command value decision unit as claimed in claim 1, further comprising a model selector for selecting one of fuel consuming characteristic models and supplies it to said output decision model generator, wherein said fuel consuming characteristic model generator generates as the fuel consuming characteristic model of a same plant a plurality of fuel consuming characteristic models in accordance with parameters including at least one of seawater temperature, fuel types to be used and a number of burners, and wherein said model selector monitors the parameters and carries out selecting of said fuel consuming characteristic model in accordance with the parameters.

7. The command value decision unit as claimed in claim 1, wherein said fuel consuming characteristic model generator monitors and output and fuel consumption of each of said plants, detects errors between monitored amounts and corresponding amounts of the generated fuel consuming characteristic model, and reforms the fuel consuming characteristic model in accordance with the errors.

8. The command value decision unit as claimed in claim 1, further comprising a model controller for controlling parameters of the fuel consuming characteristic model in response to seawater temperature.

* * * * *